Patented June 25, 1940

2,205,735

UNITED STATES PATENT OFFICE 2,205,735

COMPOSITION OF MATTER FOR THE PRODUCTION OF INSULATING MATERIALS

Philip C. Scherer, Jr., Blacksburg, Va.

No Drawing. Application November 11, 1937,
Serial No. 174,024

19 Claims. (Cl. 106—18)

The present invention relates to a process of producing compositions of matter adapted to be expanded by application of heat to form porous insulating materials.

The primary object of my invention relates to a composition of matter comprising a viscose solution, a gas-generating substance and a cementitious material, said substance being able to react with said viscose solution with the formation of gas bubbles.

Another object of this invention has to do with a composition of matter comprising a viscose solution, a gas-generating substance of the group consisting of metals, metal alloys, and metal compounds together with a cementitious material.

Other objects of my invention will become apparent to those skilled in the art from a study of the following specification.

I am well aware that, heretofore, expandible compositions have been prepared by mixing metals, etc., with mineral aggregates and cements with and without additional fillers (vide U. S. Patent 1,691,280 to Granville; U. S. Patent 1,804,753 to Douglas; U. S. Patent 1,819,018 to Eriksson; U. S. Patent 1,824,240 to Smith; etc.). Furthermore, I am well aware that U. S. Patent 2,047,187 to Becher of July 14, 1936, discloses a composition of matter consisting of viscose and exfoliated vermiculite and that U. S. Patent 2,085,047 to Schneider of June 29, 1937, sets forth a composition of matter consisting of a cellulose ester solution and gas-generating carbonates.

By extensive experimentation, I have unexpectedly found that superior insulating materials can be obtained by admixing at least one cementitious material with a viscose solution and a gas-generating substance and subsequently expanding the composition thus formed by application of heat, as set forth in my co-pending applications, Ser. No. 174,023, filed Nov. 11, 1937; Ser. No. 174,025, filed Nov. 11, 1937; and Ser. No. 174,026, filed Nov. 11, 1937.

Although I may use any gas-generating substance, such as metals, metal alloys, metal carbides, etc., which generates a gas in the form of fine bubbles by chemical interaction with viscose, I prefer to use a finely divided aluminum powder for reasons of economy. The amounts of gas-generating substances which are added to the viscose solutions may be varied at will, although I have found that an addition of about 0.1 to 0.3% of a finely divided aluminum powder gives the desired results, this percentage being calculated on the weight of the viscose solution. By increasing the amount of the gas-generating substance the porosity of the finished, i. e., expanded, product is increased and vice versa. The amount of cellulose contained in the basic viscose solution may also be varied within wide limits, although I prefer to use a viscose solution containing about 7% of cellulose by weight.

Cementitious materials, employed in my compositions, are such substances which are affected by water or alkalis, such as magnesium oxychloride cements, lime, Portland cements, plaster of Paris (gypsum), aluminum cements, etc. Magnesium oxy-chloride cements are basic magnesium chlorides of undetermined composition. They are generally produced by chemical interaction of magnesium oxides and magnesium chlorides.

Cementitious materials may also be mixed with a gas-generating substance, such as aluminum and expanded without the presence of viscose solutions, or cementitious materials may be used in combination with viscose solutions in the absence of gas-generating substances for the formation of shingles, tiles, etc.

Organic fillers, such as wood flour, fibers, wood chips, straw, etc., and refractory materials, i. e., materials which do not react with water or alkalis, may be admixed with the cementitious viscose composition before it is used for the manufacture of porous insulating materials. Soaps, resins and other known waterproofing agents may be added to these viscose compositions.

Example 1

About 25 parts by weight of lime in powdered form are admixed with about 70 parts by weight of a viscose solution (7%), and subsequently about 0.3 to 0.5 part of aluminum in finely divided form is added to this composition. Refractory materials, such as crushed stone, glass, etc., and organic fillers may be admixed with the basic composition.

Example 2

About 25 parts of lime by weight are mixed with about 70 parts by weight of a viscose solution containing about 7% of cellulose. About 0.2 to 0.5 part of aluminum powder is dispersed in this mixture. Refractory materials, organic fillers, etc. may be added to this composition. The aluminum may be replaced by other gas-generating substances.

Although these examples will serve to illustrate my invention, I wish to emphasize that I do not wish to be limited to the same since these compositions as well as their individual ingredients may be varied at will to modify the physical characteristics of the porous insulating materials produced therefrom.

Modifications of my invention will readily be recognized by those skilled in the art, and I desire to include all such modifications coming within the scope of the appended claims.

I claim:

1. A composition of matter for the production of porous insulating materials which comprises a viscose solution, a finely divided gas-generating substance selected from the group consisting of metals, metal alloys and metal carbides and a cementitious material, said gas-generating substance being able to generate a gas in the form of fine bubbles by chemical interaction with said viscose solution.

2. A composition of matter for the production of porous insulating materials which comprises a viscose solution, a finely divided gas-generating metal and a cementitious material, said metal being able to generate a gas in the form of fine bubbles by chemical interaction with said viscose solution.

3. A composition of matter for the production of porous insulating materials which comprises a viscose solution, a finely divided gas-generating metal alloy and a cementitious material, said alloy being able to generate a gas in the form of fine bubbles by chemical interaction with said viscose solution.

4. A composition of matter for the production of porous insulating materials which comprises a viscose solution, a finely divided gas-generating metal carbide and a cementitious material, said carbide being able to generate a gas in the form of fine bubbles by chemical interaction with said viscose solution.

5. A composition of matter for the production of porous insulating materials which comprises a viscose solution, a finely divided aluminum powder and a cementitious material.

6. A composition of matter comprising a viscose solution, a lime and a finely divided gas-generating substance selected from the group consisting of metals, metal alloys and metal carbides, said substance being able to generate a gas in the form of fine bubbles by chemical interaction with said viscose solution.

7. A composition of matter for the production of porous insulating materials comprising a viscose solution, a lime and a gas-generating metal, said metal being able to form a gas in the form of fine gas bubbles by chemical interaction with said viscose solution.

8. A composition of matter for the production of porous insulating materials comprising a viscose solution, a lime and a gas-generating metal alloy in finely divided form, said alloy being able to generate a gas in the form of fine bubbles by chemical interaction with said viscose solution.

9. A composition of matter for the production of porous insulating materials comprising a viscose solution, a lime and a gas-generating metal carbide in finely divided form, said carbide being able to generate a gas in the form of fine bubbles by chemical interaction with said viscose solution.

10. A composition of matter for the production of porous insulating materials comprising a viscose solution, a lime and a finely divided aluminum.

11. A composition of matter for the production of porous insulating materials comprising a viscose solution, a magnesium oxy-chloride cement and a gas-generating substance selected from the group consisting of metals, metal alloys and metal carbides in finely divided form, said substance being able to generate a gas in the form of fine bubbles by chemical interaction with said viscose solution.

12. A composition of matter for the production of porous insulating materials comprising a viscose solution, a magnesium oxy-chloride cement and a gas-generating metal in finely divided form, said metal being able to generate a gas in the form of fine bubbles by chemical interaction with said viscose solution.

13. A composition of matter for the production of porous insulating materials comprising a viscose solution, a magnesium oxy-chloride cement and a gas-generating metal carbide in finely divided form.

14. A composition of matter for the production of porous insulating materials comprising a viscose solution, a magnesium oxy-chloride cement and a gas-generating metal alloy in finely divided form, said alloy being able to generate a gas in the form of fine bubbles by chemical interaction with said viscose solution.

15. A composition of matter for the production of porous insulating materials comprising a viscose solution, a magnesium oxy-chloride cement and a finely divided aluminum.

16. A composition of matter for the production of porous insulating materials comprising a viscose solution, a cementitious material and a finely divided gas-generating substance selected from the group consisting of metals, metal alloys and metal carbides, said substance being able to generate a gas in finely divided form by chemical interaction with said viscose solution under the influence of heat.

17. A composition of matter for the production of porous insulating materials comprising a viscose solution, a cementitious material, an organic filler and a finely divided gas-generating substance selected from the group consisting of metals, metal alloys and metal carbides, said substance being able to generate a gas in the form of fine bubbles by chemical interaction with said viscose solution.

18. A composition of matter for the production of porous insulating materials comprising a viscose solution, a cementitious material, an organic filler and a finely divided gas-generating substance selected from the group consisting of metals, metal alloys and metal carbides, said substance being able to generate a gas in the form of fine bubbles by chemical interaction with said viscose solution under the influence of heat.

19. A composition of matter for the production of porous insulating materials comprising about 50 parts by weight of a viscose solution, about 10 parts by weight of a magnesium oxide, about 5 parts by weight of magnesium chloride, and about 0.1 to 0.3 part by weight of a finely divided aluminum.

PHILIP C. SCHERER, Jr.